United States Patent
Yamanaka

(10) Patent No.: US 9,197,328 B2
(45) Date of Patent: Nov. 24, 2015

(54) OPTICAL TRANSMITTER IMPLEMENTED WITH TWO QPSK MODULATORS MADE OF SEMICONDUCTOR MATERIAL AND A METHOD TO CONTROL OPTICAL POWER OUTPUT THEREFROM

(71) Applicant: SUMITOMO ELECTRIC INDUSTRIES, LTD., Osaka-shi, Osaka (JP)

(72) Inventor: Shingo Yamanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 173 days.

(21) Appl. No.: 13/767,254

(22) Filed: Feb. 14, 2013

(65) Prior Publication Data

US 2013/0216220 A1    Aug. 22, 2013

(30) Foreign Application Priority Data

Feb. 17, 2012 (JP) ................................. 2012-033178

(51) Int. Cl.
*H04B 10/08* (2006.01)
*H04B 17/00* (2015.01)
*H04B 10/04* (2006.01)
*H04B 10/12* (2006.01)
*H04B 10/548* (2013.01)
*H04B 10/50* (2013.01)
*H04B 10/556* (2013.01)

(52) U.S. Cl.
CPC .......... *H04B 10/548* (2013.01); *H04B 10/5053* (2013.01); *H04B 10/5561* (2013.01)

(58) Field of Classification Search
CPC ............. H04B 10/5053; H04B 10/548; H04B 10/5561; H04B 10/50575
USPC .......................................................... 398/197
See application file for complete search history.

(56) References Cited

U.S. PATENT DOCUMENTS

| | | | |
|---|---|---|---|
| 2008/0165813 A1* | 7/2008 | Miller ...................... | 372/29.011 |
| 2010/0142964 A1* | 6/2010 | Chang et al. .................. | 398/116 |
| 2011/0026935 A1* | 2/2011 | Akiyama et al. .............. | 398/184 |
| 2011/0044702 A1 | 2/2011 | Mizuguchi et al. | |
| 2011/0158577 A1* | 6/2011 | Doerr ................................. | 385/3 |
| 2012/0320442 A1* | 12/2012 | Gabory ......................... | 359/238 |

OTHER PUBLICATIONS

"Implementation Agreement for Integrated Polarization Multiplexed Quadrature Modulated Transmitters", Optical Internetworking Forum, Mar. 12, 2010, pp. 1-20.

* cited by examiner

*Primary Examiner* — Shi K Li
*Assistant Examiner* — Mina Shalaby
(74) *Attorney, Agent, or Firm* — Smith, Gambrell & Russell LLP

(57) ABSTRACT

An optical transmitter implemented with two QPSK (Quadrature Phase Shift Keying) modulators is disclosed. Each of the QPSK modulators provides a waveguide made of semiconductor material inducing the QCSE (Quantum Confined Stark Effect) by a bias supplied thereto. The optical performance of one of the QPSK modulators is determined by supplying a deep bias to the other of the QPSK modulator to eliminate the optical output therefrom.

14 Claims, 7 Drawing Sheets

OPTICAL TRANSMITTER IMPLEMENTED WITH TWO QPSK MODULATORS MADE OF SEMICONDUCTOR MATERIAL AND A METHOD TO CONTROL OPTICAL POWER OUTPUT THEREFROM

BACKGROUND OF THE INVENTION

1. Field of the Invention

The present invention relates to a semiconductor optical modulator and a method to control optical power output from the same.

2. Related Background Art

The optical communication system using the phase modulation, which drastically enhances the spectrum efficiency, has been proposed. Among the phase modulation techniques, the quadrature phase shift keying (QPSK) combined with the polarization multiplexing, which is called, as the Dual Polarization-Quadrature Phase Shift Keying (DP-QPSK) has been a promising technique.

The DP-QPSK mode requires the even contribution of respective QPSK modulators, one is for X-polarization and the other is for Y-polarization, to the optical power output from the DP-QPSK transmitter. Various techniques to even the contribution have been proposed; however, conventional DP-QPSK modulators have been extremely hard to control the optical power output therefrom in precisely, in particular, the contribution of two QPSK modulators to the optical output power.

SUMMARY OF THE INVENTION

One aspect according to an embodiment of the present application relates to an optical transmitter implemented with two QPSK modulators, one is for the X-polarization and the other is for the Y-polarization. Each of QPSK modulators outputs an optical signal and includes a waveguide made of semiconductor material showing the Quantum Confined Stark Effect (QCSE). The waveguide accompanies with an electrode to receive a bias supplied thereto. The optical transmitter of the embodiment further provides a power controller. The power controller provides a bias to the electrode of the waveguide in one of the QPSK modulators to eliminate the optical output derived from the other of the QPSK modulator. Thus, the contribution of the optical signals each output from the QPSK modulators to the output of the optical transmitter is controlled precisely and easily.

Each of two QPSK modulators provides a power monitor and a supplemental path divided from the waveguide. The power monitor optically couples with the supplemental path to detect light propagating in the supplemental path. The contribution of respective QPSK modulators to the total output of the optical transmitter is determined through the output of the power monitors in respective QPSK modulators. Each of the QPSK modulators includes a pair of Mach-Zender (MZ) interferometer and the pair of the waveguides each optically coupled with the MZ interferometer. The bias to eliminate the contribution of one of the QPSK modulators is provided to both waveguides concurrently.

The second aspect of another embodiment of the application relates to a method to control the optical transmitter that includes two QPSK modulators. Each of the QPSK modulators provides a waveguide and a power monitor. The waveguide is made of semiconductor material showing the Quantum Confined Stark Effect (QCSE) provided with a bias, or an electric field, while, the power monitor monitors the optical power output from the waveguide.

The method of the embodiment includes steps of: (1) first initializing the optical transmitter by (1a) providing a bias to the waveguide in one of the QPSK modulators to eliminate optical power output therefrom and determining a first contribution of the other of the QPSK modulators, which is measured by an output of the power monitor provided in the other of the QPSK modulators, to the output of the optical transmitter, and (1b) providing a bias to the waveguide in the other of the QPSK modulators to eliminate optical power output therefrom and determining a second contribution of the one of the QPSK modulators, which is measured by an output of the power monitor provided in the one of the QPSK modulators, to the output of the optical transmitter; and (2) practically operating optical transmitter by, (2a) increasing a bias provided to the waveguide in the one of the QPSK modulators when the first contribution measured by the current output of the power monitor in the one of the QPSK modulators is greater than the second contribution determined by the current output of the power monitor in the other of the QPSK modulators, (2b) increasing a bias provided to the waveguide in the other of the QPSK modulators when the second contribution determined by the output of the power monitor in the other of the QPSK modulators is greater than the first contribution determined by the current output of the power monitor in the one of the QPSK modulators, (2c) comparing a current output power of the optical transmitter determined by a sum of the first contribution and the second contribution with a target output power when the first contribution is substantially equal to the second contribution, and (2d) adjusting optical power output from a light source and entering the QPSK modulators to set the sum of two contributions to be equal to the target output power of the optical transmitter.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF THE PREFERRED EMBODIMENTS

Next, some preferred embodiments according to the present invention will be described in detail as referring to drawings. In the description of the drawings, the numerals or symbols same or similar to each other will refer to the elements same or similar to each other without overlapping explanations.

Figure 1:
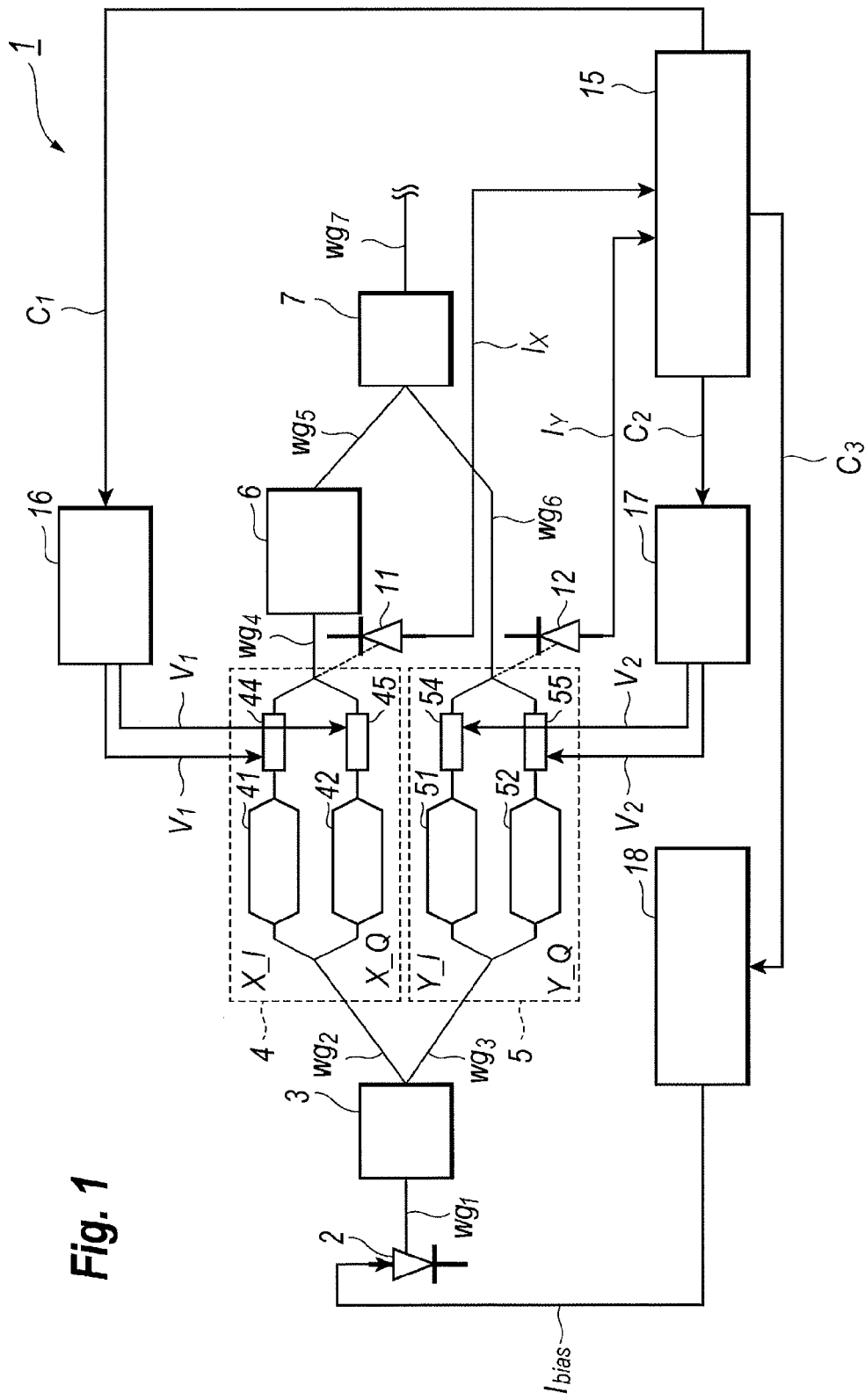
FIG. 1 is a functional block diagram of an optical transmitter according to an embodiment of the present invention.

FIG. 1 schematically illustrates an optical transmitter 1 including semiconductor optical modulators, 4 and 5. The optical transmitter 1, which is the type of the DP-QPSK (Dual Polarization Quadrature Phase Shift Keying), generates the optical signal containing first and second modulated signals with polarizations perpendicular to each other, where they are denoted as the X-polarization and Y-polarization in this specification. The optical transmitter 1 includes light source 2, a beam splitter 3, first and second QPSK modulators, 4 and 5, a polarization rotator 6, a polarization multiplexer 7, first and a second power monitors, 11 and 12, a power controller 15, two power supplies, 16 and 17, and a source driver 18. The optical transmitter 1 thus configured and applicable to the optical communication system transmits the polarization multiplexed optical signal containing the X-polarized signal and the Y-polarized signal to an external optical receiver.

The light source 2, which is a type of a semiconductor laser diode (LD), generates light with a preset wavelength and provides the light to the beam splitter 3 through the optical waveguide $wg_1$. The light generated by the light source 2 contains substantially only one polarization, in particular, when the light source 2 is a type of the edge-emitting laser diode, the light emitted from this LD has the polarization substantially in parallel to a direction where the active layer thereof extends. The light source 2 may vary the optical power of the light depending on the bias current $I_{bias}$ provided from the source driver 18. The beam splitter 3, which is a type of the polarization maintaining splitter, divides the light coming from the light source 2 into two beams, each of which has the polarization substantially in parallel to the direction where the active layer of the LD extends. The beam splitter 3 provides one of the beams to the first QPSK modulator 4 through the optical waveguide $wg_2$ and the other to the second QPSK modulator 5 through the waveguide $wg_3$ substantially.

The first QPSK modulator 4 modulates the light coming from the beam splitter 3 to generate a first modulated signal, and provides the first modulated signal to the polarization rotator 6 through the waveguide $wg_4$. Similarly, the second QPSK modulator 5 modulates the light also coming from the beam splitter 3 to generate a second modulated signal, and provides thus modulated second signal directly without passing the polarization rotator 6 to the polarization multiplexer 7 through the waveguide $wg_6$.

Figure 2A:
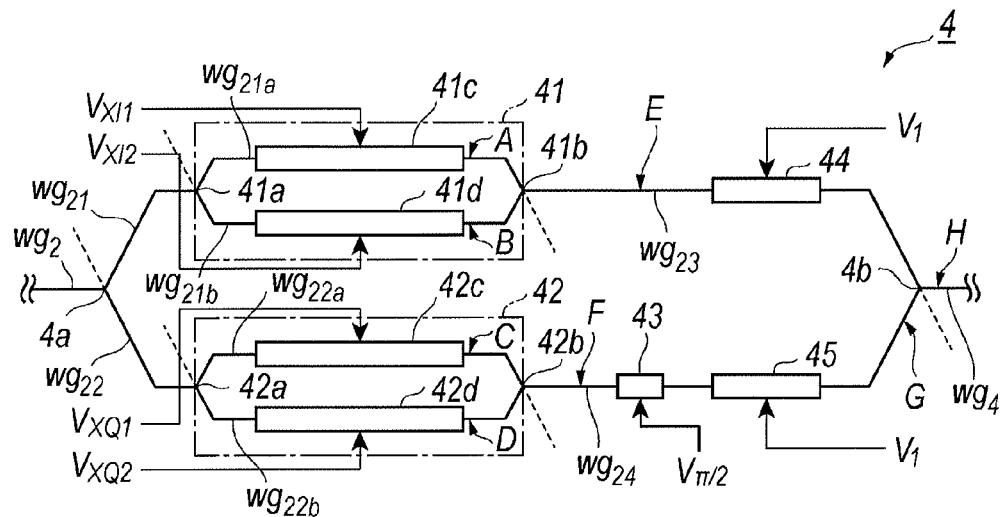
FIG. 2A is a functional block diagram of the first QPSK modulator for the X-polarization.
Figure 2B:
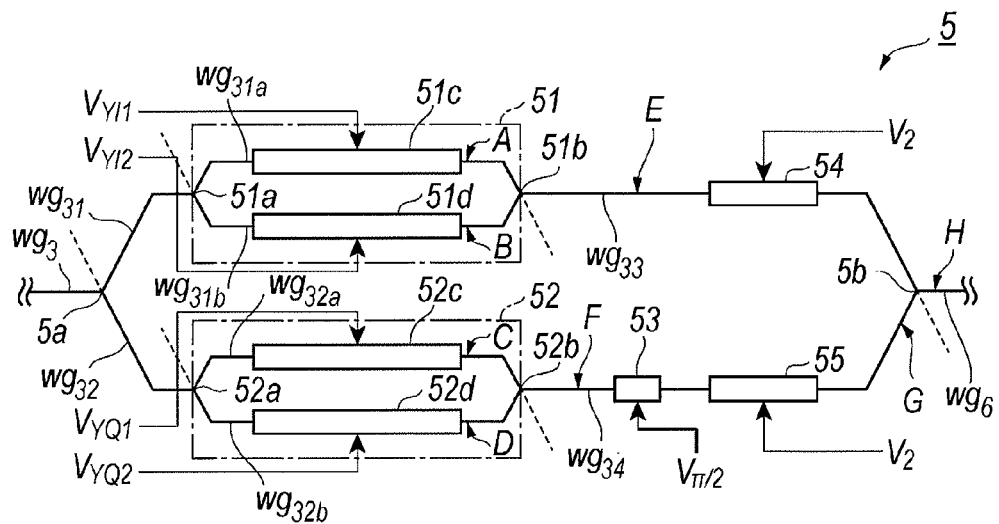
FIG. 2B is a function block diagram of the second QPSK modulator for the Y-polarization.

FIG. 2A schematically illustrates the arrangement of the first QPSK modulator 4, while, FIG. 2B schematically illustrates the arrangement of the second QPSK modulator 5. The first QPSK modulator 4, as shown in FIG. 2A, includes the first Mach-Zender (MZ) interferometer 41, the second MZ interferometer 42, an electrode 43 to shift the phase of the light, and another two electrodes, 44 and 45, to adjust the phase of the light propagating thereunder. The waveguide $wg_2$ in the first QPSK modulator 4 is branched into two waveguides, $wg_{21}$ and $wg_{22}$, at an input port 4a, one of which $wg_{21}$ extends to the input port 41a of the first MZ interferometer 41, while, the other $wg_{22}$ extends to the other input port 42a of the second MZ interferometer 42. The waveguide $wg_{23}$ extends from the output port 41b of the first MZ interferometer 41 to the output port 4b of the first QPSK modulator 4; while, another waveguide $wg_{24}$ extends from the output port 42b of the second MZ interferometer 42 to the output port 4b of the first QPSK modulator 4. Two waveguides, $wg_{23}$ and $wg_{24}$, are combined at the output port 4b.

The first MZ interferometer 41 generates the first modulated signal by modulating the light coming from the beam splitter 3 by signals, $V_{XI1}$ and $V_{XI2}$. The waveguide $wg_{21}$ is divided into two waveguides, $wg_{21a}$ and $wg_{21b}$, at the input port 41a of the first MZ interferometer 41, each of the divided waveguides, $wg_{21a}$ and $wg_{21b}$, extends from the input port 41a to the output port 41b. At the output port 41b, two waveguides, $wg_{21a}$ and $wg_{21b}$, are combined together to the waveguide $wg_{23}$. The waveguide $wg_{21a}$ provides the first electrode 41c, while, the waveguide $wg_{21b}$ provides the second electrode 41d thereon.

Further specifically, the signal passing the optical waveguide $wg_{21}$ is guided to the waveguides, $wg_{21a}$ and $wg_{21b}$. The first electrode 41c receives the modulation signal $V_{XI1}$, while, the second electrode 41d receives the other modulation signal $V_{XI2}$; each of the modulation signals, $V_{XI1}$ and $V_{XI2}$, which reflect the data signal $D_{XI}$ to be transmitted by the XI-polarization mode, has the amplitude equal to each other but the polarity or phase thereof different from others. The light propagating in the waveguide $wg_{21a}$ is modulated by applying the modulation signal $V_{XI1}$ to the first electrode 41c to cause the first modulated signal. Similarly, the light propagating in the other waveguide $wg_{21b}$ is modulated by applying the modulation signal $V_{XI2}$ supplied to the second electrode 41d to cause the second modulated signal. Finally, the first and second modulated signals are multiplexed at the output port 41b to cause the XI-modulated signal, which is output to the waveguide $wg_{23}$.

The second MZ-interferometer 42 generates the second modulated signal by modulating the light extracted by the beam splitter 3 with the data $D_{XQ}$. The second MZ-interferometer 42 branches the waveguide $wg_{22}$ into two waveguides, $wg_{22a}$ and $wg_{22b}$, at the input port 42a, where the branched waveguides, $wg_{22a}$ and $wg_{22b}$, extend from the input port 42a to the output port 42b, and are joined together to the waveguide $wg_{24}$ at the output power 42b. The waveguides, $wg_{22a}$ and $wg_{22b}$, provide the third electrode 42c and the fourth electrode 42d, respectively.

Further specifically, the signal passing the optical waveguide $wg_{22}$ is guided to the waveguides, $wg_{22a}$ and $wg_{22b}$, at the input port 42a. The third electrode 42c receives the modulation signal $V_{XQ1}$, while, the fourth electrode 42d receives the other modulation signal $V_{XQ2}$; each of the modulation signals, $V_{XQ1}$ and $V_{XQ2}$, which reflect the data signal $D_{XQ}$ to be transmitted by the XQ-polarization mode, has the amplitude equal to each other but the polarity or the phase thereof different from others. The light propagating in the waveguide $wg_{22a}$ is modulated by applying the modulation signal $V_{XQ1}$ to the third electrode 42c to cause the third modulated signal. Similarly, the light propagating in the waveguide $wg_{22b}$ is modulated by applying the modulation signal $V_{XQ2}$ to the fourth electrode 42d to cause the fourth modulated signal. Finally, the third and fourth modulated signals are multiplexed at the output port 42b to cause the XQ-modulated signal, which is output to the waveguide $wg_{24}$.

The electrode 43, which is formed on the waveguide $wg_{24}$, shifts the phase of the XQ-modulated signal caused in the second MZ interferometer 42 by $\pi/2$ radian (rad). The electrode 43 receives a bias with a magnitude of $V_{\pi/2}$, where $V_{\pi/2}$ means a voltage to shift the phase of the light propagating in the waveguide thereunder by $\pi/2$ (rad).

The electrode 44 on the waveguide $wg_{23}$ adjusts the phase of the XI-modulated signal caused in the first MZ interferometer 41 and propagating in the waveguide $wg_{23}$. The other electrode 45 formed on the waveguide $wg_{24}$ also adjusts the phase of the XQ-modulated signal caused in the second MZ interferometer 42 and shifted in the phase thereof by the electrode 43. The electrode 44 receives the first bias $V_1$ provided from the first power supply 16, and the other electrode 45 receives the bias $V_1$ provided also from the first power supply 16. The XI-modulated signal adjusted in the phase thereof by the electrode 44 and the XQ-modulated signal adjusted in the phase thereof by the electrode 45 are multiplexed at the output port 4b to be guided to the waveguide $wg_4$.

The second QPSK modulator 5 shown in FIG. 2B includes the third MZ-interferometer 51, the fourth MZ-interferometer 52, the electrode 53 for rotating the phase of the light by π/2 (rad), and two electrodes, 54 and 55, to adjust the phase of the light. Details of the arrangement, the operation, and the function of the second QPSK modulator 5 are omitted because they are substantially same with those of the first QPSK modulator 4. However, the second QPSK modulator, in particular, the third MZ interferometer 51 and the fourth MZ interferometer 52 shown in FIG. 2B are driven by the signals, $V_{YI1}$, $V_{YI2}$, $V_{YQ1}$, and $V_{YQ2}$; and two electrodes, 54 and 55, receive the second bias $V_2$.

Figure 3:
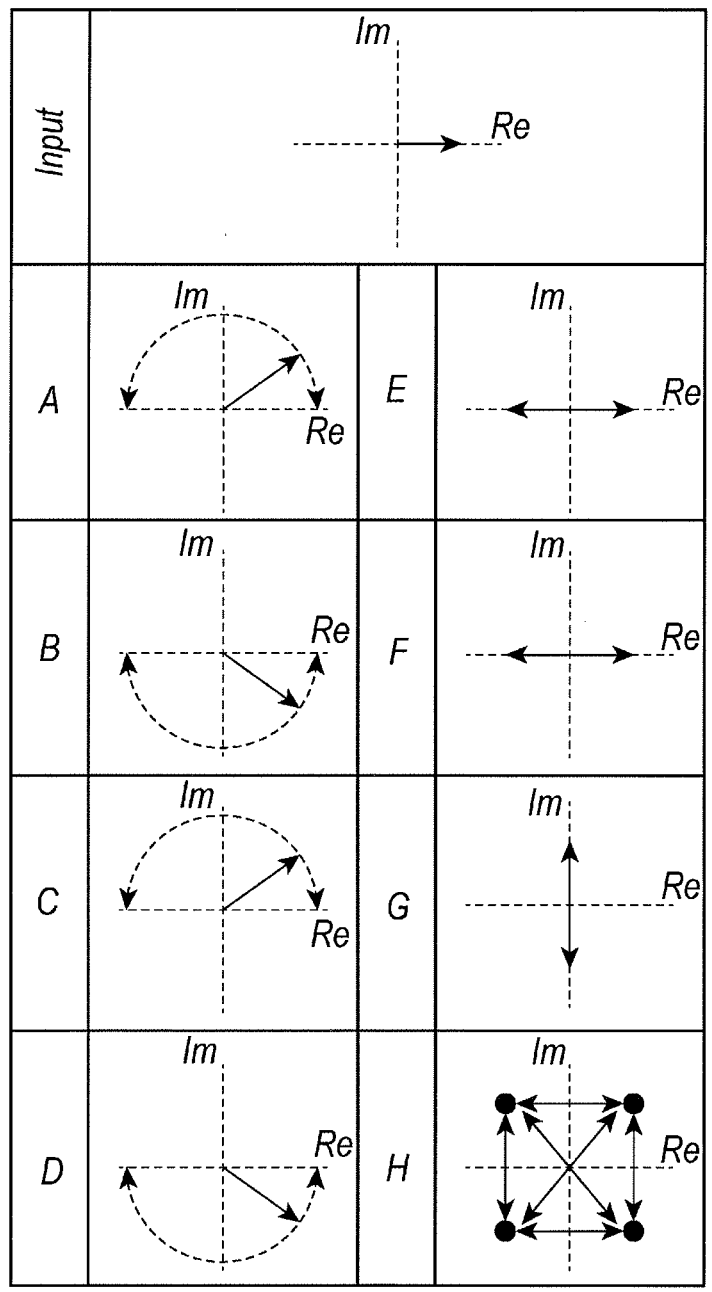
FIG. 3 explains the magnitude and phase of light measured at various point in the QPSK modulator.

Next, the phase of the light at respective positions in the first QPSK modulator 4 and the second QPSK modulator 5 will be described as referring to FIG. 3. FIG. 3 shows by the polar co-ordinate the phase of the light output from the LD 2 and that measured at various positions, A to H, appeared in FIG. 2A. The phases of the light in respective positions in the first QPSK modulator 4 are equal to the phases of the light in positions of the second QPSK modulator 5 corresponding to those in the first QPSK modulator 4; accordingly, the explanation below concentrates on the case of the first QPSK modulator 4.

One condition is assumed that the input port 4a of the first QPSK modulator 4 receives the light S with the phase of 0 (rad). In other words, the phase of the light at the input port 4a is assumed to be 0 (rad) as a reference. At the input port 4a, the light S is divided into two each propagating in the waveguides, $wg_{21}$ and $wg_{22}$. The light propagating in the former waveguide $wg_{21}$ is further divided into two at the input port 41a of the first MZ interferometer 41 each propagating in the waveguides, $wg_{21a}$ and $wg_{21b}$. The light propagating in the waveguide $wg_{21a}$ advances the phase thereof by the driving signal $V_{XI1}$; accordingly, the phase of the light $S_A$ measured at the position A in the end of the first electrode 41c may vary from 0 to π (rad) in the upper half circle of the polar coordinate.

On the other hand, the light propagating in the other waveguide $wg_{21b}$ delays the phase thereof by the driving signal $V_{XI2}$. Then, measuring the light $S_B$ at the end of the second electrode 41d, namely the position B, the phase of the light varies from 0 to −π (rad) in the lower half circle in the polar coordinate. Multiplexing the light $S_A$ coming from the waveguide $wg_{21a}$ with the light $S_B$ coming from the waveguide $wg_{21b}$ at the output port 41b of the first MZ interferometer 41, which causes the light $S_E$ propagating in the waveguide $wg_{23}$, the light $S_E$ may have only two phase statuses of 0 (rad) and π (rad).

Similarly, the light S propagating in the waveguide $wg_{22}$ is divided into two parts at the input port 42a, each of the divided light propagating in the waveguides, $wg_{22a}$ and $wg_{22b}$. The former light propagating in the wage guide $wg_{22a}$ advances the phase thereof by the driving signal $V_{XQ1}$ applied to the third electrode 42c and the phase status of the light $S_C$ measured at the end of the third electrode 42c varies from 0 to π (rad) in the upper half circuit of the polar co-ordinate. On the other hand, the other light divided at the input port 42a delays the phase thereof during the propagation in the waveguide $wg_{22b}$ by the driving signal $V_{XQ2}$ applied to the fourth electrode 42d. Then, the phase status of the light $S_D$ measured at the end of the fourth electrode 42d varies from 0 to −π (rad) in the lower half circle of the polar co-ordinate.

Multiplexing two light, $S_C$ and $S_D$, at the output port 42b of the second MZ interferometer 42 to cause the light $S_F$ propagating in the waveguide $wg_{24}$, the phase of the light $S_F$ measured at the waveguide $wg_{24}$ may take only two statuses of 0 and π (rad) because two light, $S_C$ and $S_D$, have the amplitude substantially equal to each other but the phase thereof different from others. The electrode 43 on the waveguide $wg_{24}$ shifts the phase of the light propagating thereunder by π/2 (rad); accordingly, the light $S_G$ passing the electrode 43 may take only two phase statuses of π/2 (rad) and 3π/2 (rad).

Multiplexing the light $S_E$ coming from the first MZ interferometer 41 with the light $S_G$ from the second MZ interferometer at the output port 4b to cause the light $S_H$ propagating in the waveguide $wg_4$, the light $S_H$ may take four phase statuses of π/4(rad), 3π/4(rad), 5π/4(rad), 7π/4(rad). Thus, the first QPSK modulator 4 modulates the light S by the QPSK mode.

The input ports, 4a, 41a, and 42a, and output ports, 41b, 42b, and 4b, may operate as, or have the function of the 2×2 optical directional coupler. Accordingly, the light may be guided at the input ports, 4a, 41a, and 42a, and at the output ports, 4b, 41b and 42b, not only in the waveguides identified in FIG. 2A but in supplemental paths extending in directions denoted by broken lines in FIG. 2A. The light guided to the supplemental paths is exemplarily described for the case at the output port 41b. When the light $S_A$ coming from the waveguide $wg_{21a}$ has the phase substantially same as the phase of the light $S_B$ coming from the waveguide $wg_{21b}$, that is, the phase difference between two light, $S_A$ and $S_B$, is 0 (rad); the light multiplexed at the output port 41b is guided in the whole portion thereof in the waveguide $wg_{23}$. On the other hand, when the phase difference between the light, $S_A$ and $S_B$, becomes π/2 (rad), the multiplexed light is evenly divided into the waveguide $wg_{23}$ and the supplemental path. Furthermore, when the phase difference becomes π (rad), the multiplexed light at the output port 41b fully advances in the supplemental path and no light is caused in the waveguide $wg_{23}$.

Referring back to FIG. 1, the polarization rotator 6 rotates the polarization of the light passing therethrough, namely, the light caused in the first QPSK modulator 4, rotates the polarization thereof by an angle of π/2. Accordingly, the light propagating in the waveguide $wg_5$ has the polarization direction perpendicular to that of the light propagating in the waveguide $wg_6$. Multiplexing two beams each propagating on the waveguides, $wg_5$ and $wg_6$, by the polarization multiplexer 7, the optical transmitter may output light modulated by the DP-QPSK mode in the waveguide $wg_7$.

The first power monitor 11, which is formed on the supplemental path for the output port 4b, monitors the power of the light output from the first QPSK modulator 4. As explained above, when two optical signals to be multiplexed at the output port 4b have the phase difference of except for 0 or π (rad), the multiplexed light is divided into the waveguide $wg_4$ and the supplemental path. The first power monitor 11, which detects the light coming in the supplemental path, may sense the optical power of the light output in the waveguide $wg_4$ indirectly through the light coming in the supplemental path, and provides the first photocurrent $I_X$ corresponding to the detected optical power to the power controller 15.

The second power monitor 12 has the function same with those of the first power monitor 11 described above. That is, the second power monitor, which detects the light coming in the supplemental path attributed to the output power of the second QPSK modulator 5, may monitor the optical power of the light output from the second QPSK modulator 5 and propagating on the waveguide $wg_6$ indirectly through the light on the supplemental path. The second power monitor 12 provides the second photocurrent $I_Y$ corresponding to thus detected optical power of the light output from the second QPSK modulator 5 to the power controller 15.

The power controller 15 adjust, based on thus detected photocurrents, $I_X$ and $I_Y$, by the power monitors, 11 and 12, the first bias $V_1$ output from the first power supply 16 to the first QPSK modulator 4 and the second bias $V_2$ output from the second power supply 17 to the second QPSK modulator 5. Specifically, the power controller 15 provides the first control signal $C_1$ to the first power supply 16, while, the second control signal $C_2$ to the second power supply 17. The former control signal $C_1$ sets the first bias $V_1$ of the first power supply 16, and the latter control signal $C_2$ sets the second bias $V_2$ of the second power supply 17.

Furthermore, the power controller 15 also controls the output power of the light source 2 based on the monitored photocurrents, $I_X$ and $I_Y$. The power controller 15 provides the third control signal $C_3$ to the source driver 18 to sets the bias current $I_{bias}$ to the light source 2. Details of the power control by the power controller 15 will be described later.

The first power supply 16 is a type of, what is called, the variable power supply. Receiving the control signal $C_1$ provided from the power controller 15, the first power supply 16 sets the first bias $V_1$ provided to the electrodes, 44 and 45, in the first QPSK modulator 4.

The second power supply 17 is also a type of the variable power supply. Receiving the control signal $C_2$ also provided from the power controller 15, the second power supply 17 sets the second bias $V_2$ provided to the electrodes, 54 and 55, in the second QPSK modulator 5.

The source driver 18 controls the optical output power of the light source 2. Specifically, the source controller 18, based on the third control signal $C_3$ also provided from the power controller 15, adjusts the bias current $I_{bias}$ supplied to the light source 2.

Figure 4:
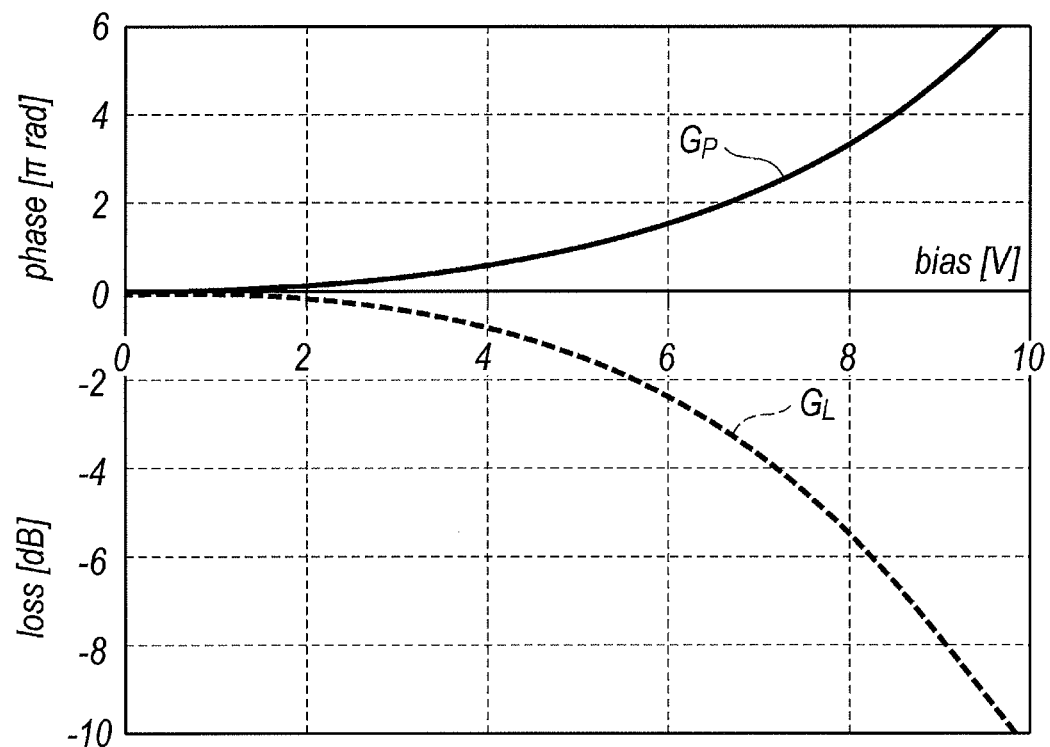
FIG. 4 shows behaviors of the phase shift and the optical loss observed in a waveguide made of semiconductor material.

Next, the optical loss caused in the optical waveguides implemented within the optical transmitter 1 will be described. FIG. 4 exemplarily shows a phase change and an optical loss of a waveguide against the bias voltage applied thereto. The waveguide wg according to the present embodiment is made of semiconductor material showing, what is called, the Stark effect, in particular, the quantum confined Stark effect (hereafter denoted as QCSE). The QCSE induces a change of the refractive index of the semiconductor material, which may shift the phase of the light propagating therein. The QCSE also induces the optical loss of the light propagating therein due to the optical absorption.

As shown in FIG. 4, the phase shift of the light increases as the bias applied thereto the waveguide wg. Moreover, the behavior of the phase shift is nonlinear with respect to the applied bias, that is, as increasing the applied bias, the rate of the increment of the phase shift becomes large. Concurrently, the optical loss of the light also increases nonlinearly as the bias applied to the waveguide wg increases.

In the optical transmitter 1 implementing with the optical waveguide wg made of semiconductor material described above, the phase and the optical loss of respective light propagating on the waveguides, $wg_{23}$, $wg_{24}$, $wg_{33}$, and $wg_{34}$, may be adjusted by applying biases to the electrodes, 44, 45, 54, and 55, each formed on the waveguides.

Figure 5:
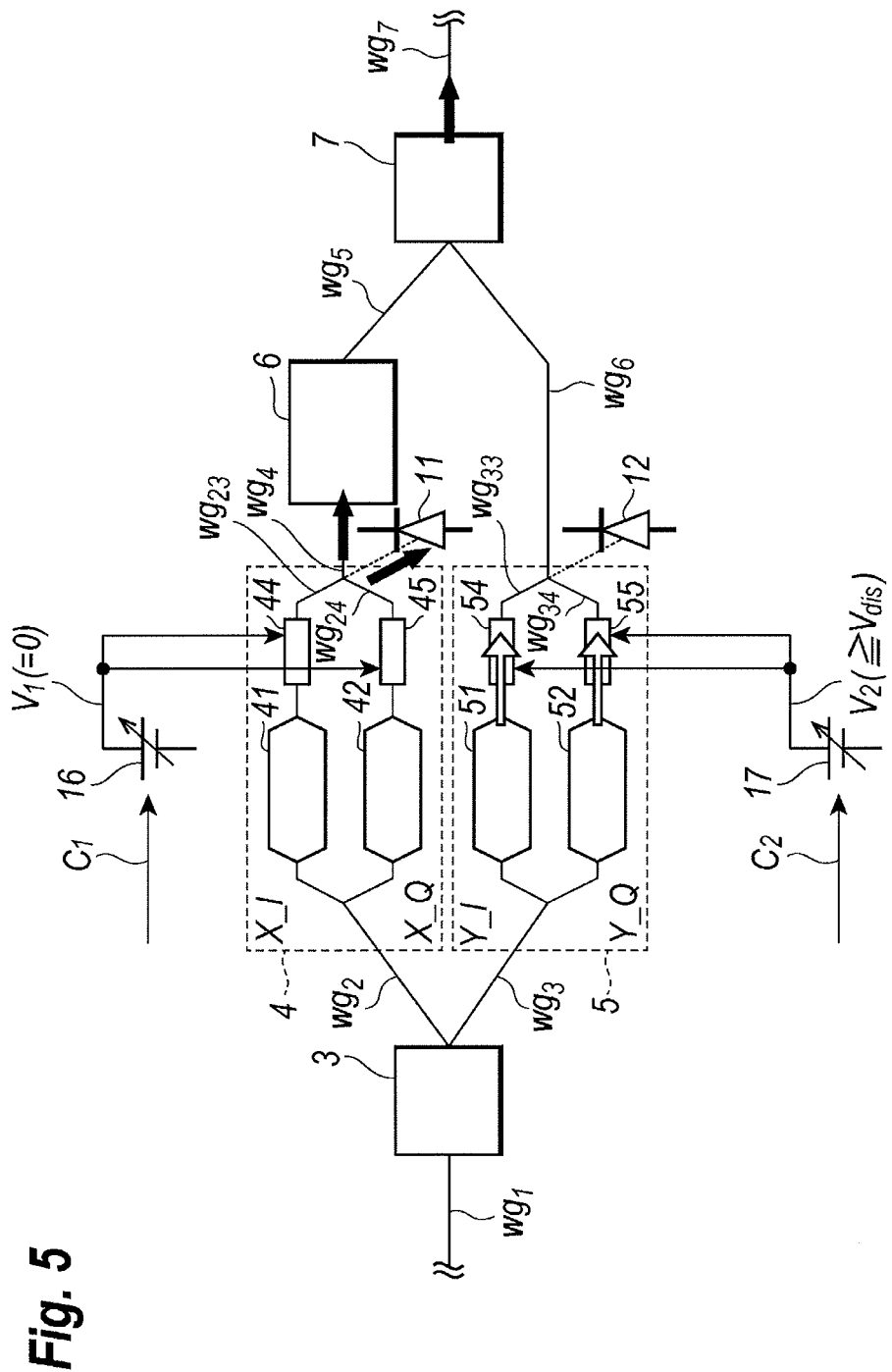
FIG. 5 describes the initialization of the optical transmitter shown in FIG. 1.
Figure 6:
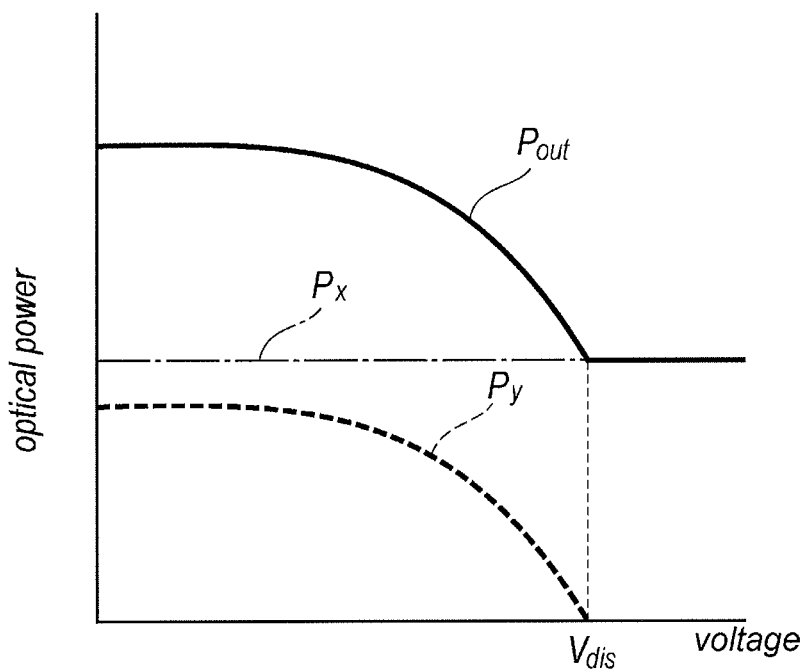
FIG. 6 shows behaviors of the optical output against the bias supplied to the waveguide implemented within respective QPSK modulators.

Next, the method to initialize the optical transmitter will be described as referring to FIGS. 5 and 6. FIG. 5 schematically illustrates the method to initialize the optical transmitter 1, while, FIG. 6 schematically illustrates a relation between the optical power of the light propagating on the waveguides, $wg_{33}$ and $wg_{34}$, respectively, and the bias applied thereto. The initialization of the optical transmitter 1 evaluates relations between the first photocurrent $I_X$ and the optical output power $P_{OUT}$ of the optical transmitter 1, and the relation between the second photocurrent $I_Y$ and the output power $P_{OUT}$.

First, operating the optical transmitter 1, the driving signals, $V_{XI1}$, $V_{XI2}$, $V_{XQ1}$, and $V_{XQ2}$ are supplied to respective modulating electrodes, 41c, 41d, 42c, and 42d, of the first QPSK modulator 4. Also, the driving signals, $V_{YI1}$, $V_{YI2}$, $V_{YQ1}$, and $V_{YQ2}$, are supplied to respective electrodes, 51c, 51d, 52c and 52d, of the second QPSK modulator. Then, the optical transmitter 1 is practically driven.

Then, the relation between the first photocurrent $I_X$ output from the first power monitor 11 and the optical power $P_{OUT}$ output from the optical transmitter 1 are evaluated. Specifically, monitoring the photocurrent $I_Y$, the second bias $V_2$ supplied to the electrodes, 54 and 55, in the second QPSK modulator 5 is increased until the QCSE fully absorbs the light propagating in the waveguides, $wg_{33}$ and $wg_{34}$. Exceeding the bias $V_2$ over the critical voltage $V_{dis}$, the light propagating in the waveguides, $wg_{33}$ and $wg_{34}$, is fully absorbed. Then, the optical output of the optical transmitter 1 comes from the first QPSK modulator 4.

Referring to FIG. 6, the dependence of the optical power in the waveguides, $wg_{33}$ and $wg_{34}$ against the bias is described. The horizontal axis of FIG. 6 denotes the bias $V_2$ supplied to the electrodes, 54 and 55, each for the waveguides, $wg_{33}$ and $wg_{34}$, respectively, while, the vertical axis denotes the optical power $P_{OUT}$ of the light output from the optical transmitter 1, where $P_X$ corresponds to the optical power output from the first QPSK modulator 4, while, $P_Y$ is the optical power output from the second QPSK modulator 5. The total output power $P_{OUT}$ is the sum of respective power, $P_X$ and $P_Y$.

Increasing the second bias $V_2$ supplied to the second QPSK modulator 5, the power $P_Y$ decreases nonlinearly. When the bias $V_2$ exceeds the critical one $V_{dis}$, the optical power output from the second QPSK modulator 5 disappears, while, that from the first QPSK modulator 4 is left constant, that is, independent of the second bias $V_2$. Thus, increasing the bias $V_2$ for the second QPSK modulator 5, the optical output power $P_{OUT}$ of the optical transmitter 1 becomes substantially equal to the optical output power $P_X$ of the first QPSK modulator 4.

Setting the first bias $V_1$ to be 0 while the second bias $V_2$ to be deep enough to exceed the critical bias Vdis, the optical output power $P_{OUT}$ of the optical transmitter 1 may be determined only by the first QPSK modulator 4. Detecting the output of the first QPSK modulator 4 by the first power monitor 11, which causes the first photocurrent $I_X$, then, the relation between the first photocurrent $I_X$ and the optical output power POUT of the optical transmitter 1 is determined by:

$$P_{OUT} = P_X = \alpha \times I_X, \quad (1)$$

where $\alpha$ is the proportional constant involving effects of the optical absorption loss in the first QPSK modulator 4, the scattering in the performance of the polarization rotator 6, that of the optical multiplexer 7, and that of the optical sensitivity of the power monitor, and so on.

Similarly, the relation of the second photocurrent $I_Y$ and the optical output power $P_{OUT}$ will be evaluated. Setting the first bias $V_1$ exceeding the threshold Vdis, then the output power of the first PQSK modulator 4 will be fully attenuated; the procedure sets the second bias $V_2$ to be zero (0). At that time, only the second QPSK modulator 5 may output substantial optical power from the optical transmitter 1, and the second power monitor 12 may detect the optical output from the second QPSK modulator 5 and generate the second photocurrent $I_Y$. The optical output from the optical transmitter 1 has the relation against the second photocurrent $I_Y$ as follows:

$$P_{OUT}=P_Y=\beta \times I_Y, \quad (2)$$

where $\beta$ is the proportional constant but contains effects of unevenness of the optical absorption loss in the second QPSK modulator 5, that of the polarization multiplexer, that of the sensitivity of the second power monitor 12, and so on.

The power controller 15 keeps thus obtained two parameters, $\alpha$ and $\beta$. In a practical operation of the optical transmitter 1, both of the first and second QPSK modulators, 4 and 5, will active, or cause substantial optical power to respective power monitors, 11 and 12. Then, the optical power output from the optical transmitter 1 may be given by:

$$P_{OUT}=P_X+P_Y=\alpha \times I_X+\beta \times I_Y. \quad (3)$$

Thus, once obtaining two parameters, $\alpha$ and $\beta$, it is unnecessary to branch the optical beam output from the optical transmitter 1 to detect the optical output power thereof. Two power monitors, 11 and 12, may detect respective optical power output from the QPSK modulators, 4 and 5.

Figure 7:
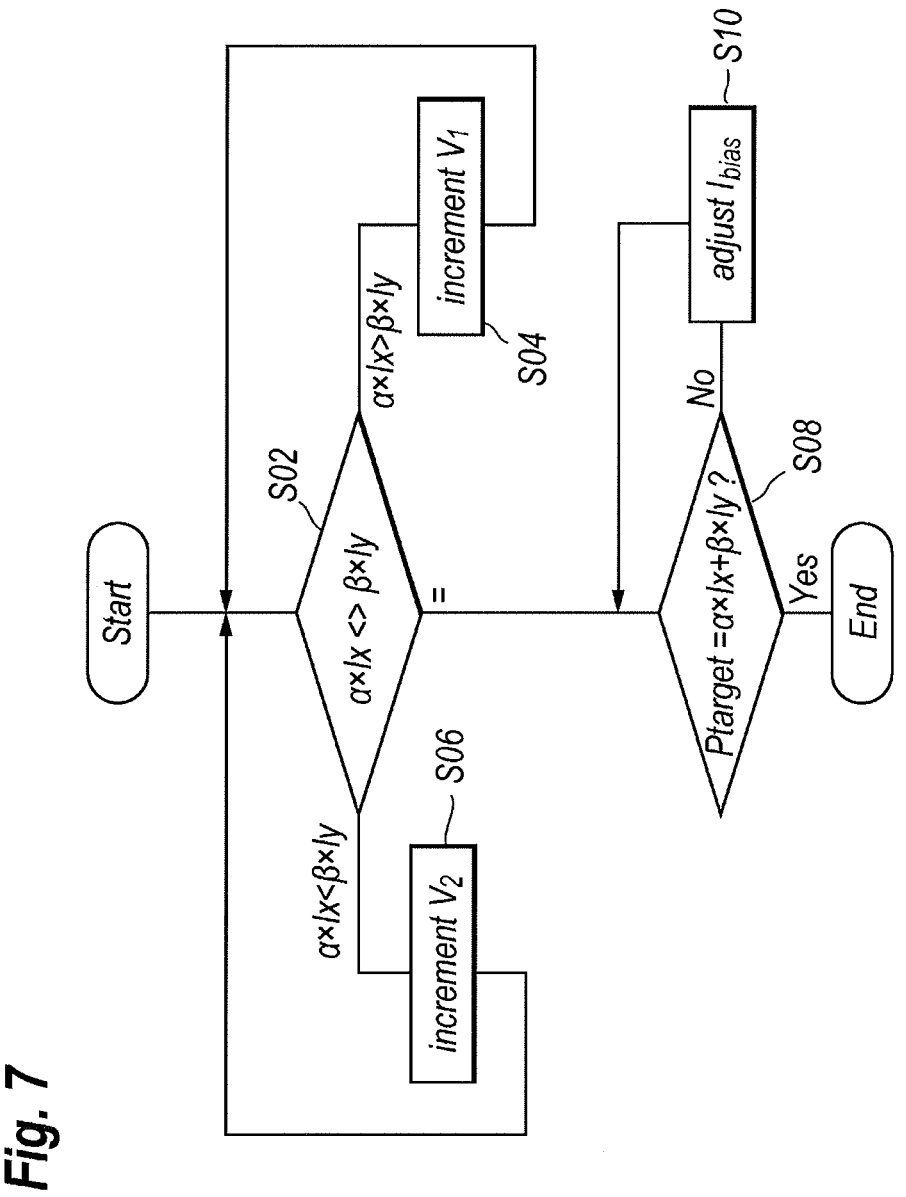
FIG. 7 is a flow chart to controls the optical power output from the optical transmitter.

An algorithm to control the optical power output from the optical transmitter 1 will be described as referring to a flow chart shown FIG. 7. The algorithm of FIG. 7 may be performed in a practical operation of the optical transmitter 1 periodically after the initialization to evaluate two parameters, $\alpha$ and $\beta$.

First, the power controller 15 receives from the first and second power monitors, 11 and 12, the first and second photocurrents, $I_X$ and $I_Y$, respectively. Then, the power controller 15 estimates the optical power output from respective QPSK modulators, 4 and 5, by reading two parameters, $\alpha$ and $\beta$, held therein and comparing two products, $\alpha \times I_X$ and $\beta \times I_Y$, at step S02. When the product $\alpha \times I_X$ for the first QPSK modulator 4 is less than the latter product $\beta \times I_Y$, the power controller 15 sends the control signal $C_2$ to the second power supply 17 to increase the second bias $V_2$ at step S06, which decreases the optical power output from the second QPSK modulator 5 but keeps the first control signal $C_1$ unchanged.

On the other hand, when the product $\beta \times I_Y$ concerning to the second QPSK modulator 5 is less than the first product $\alpha \times I_X$, the power controller 15 sends the command $C_1$ to the first power supply 16 to increase the bias $V_1$ at step S04, which enhances the optical absorption by the waveguides, $wg_{23}$ and $wg_{24}$, in the first QPSK modulator 4, and the first photocurrent $I_X$ decreases.

Finally, when two products, $\alpha \times I_X$ and $\beta \times I_Y$, are substantially equal to each other, the power controller 15 performs the second comparison whether a sum of two products is equal to the target power $P_{target}$ or not, at step S08. Because the steps, S04 and S06, decreases the optical power output from respective QPSK modulators, 4 and 5, the sum of the optical power is probably less than the target optical power $P_{target}$ set in the optical transmitter 1. The power controller 15 sends the command $C_3$ to the source driver 18 to increase the bias current $I_{bias}$ to the light source 2 at step S10, and iterates the steps, S08 and S10, to compare the sum of the optical power with the target optical power $P_{target}$ until the sum becomes substantially equal to the target power $P_{OUT}$. When the sum of the optical power is substantially equal to the target optical power $P_{target}$ at the comparison of step S08, the procedure to adjust the biases, $V_1$ and $V_2$, and the bias current $I_{bias}$ is completed.

In the process described above, the adjustment of the first bias $V_1$, or that of the second bias $V_2$, possibly varies the phase status of the waveguides, $wg_{23}$ and $wg_{24}$, or those waveguides, $wg_{33}$ and $wg_{34}$. However, the first biases $V_1$, or the second bias $V_2$, is commonly supplied to respective electrodes, 44 and 45, on the waveguides, $wg_{23}$ and $wg_{24}$, or the electrodes, 54 and 55, on the waveguides, $wg_{33}$ and $wg_{34}$; accordingly, phase difference between the light propagating in respective waveguides, $wg_{23}$ and $wg_{24}$, or the waveguides, $wg_{33}$ and $wg_{34}$, is kept substantially invariant. Thus, the first QPSK modulator 4 and the second QPSK modulator 5 cause no degradation except for the optical loss thereof by varying the biases, $V_1$ and $V_2$.

A conventional optical transmitter implemented with two QPSK modulators often provides a polarization de-multiplexer in downstream thereof to divide the optical beam output from the optical transmitter into two components whose polarization vectors are different by 90°. This arrangement not only requires an additional optical component, namely, the optical de-multiplexer, but causes instability when two optical beams each output from respective QPSK modulators have the polarizations not apart by exactly $\pi/2$.

A conventional method to measure the optical power output from one of the QPSK modulators (X-modulator) is done by supplying the two modulation signals, $V_{YT1}$ and $V_{YT1}$, with the phase difference of $\pi$ and other two modulation signals, $V_{YQ1}$ and $V_{YQ2}$, also with the phase difference of $\pi$ to vanish the optical output from the other modulator by guiding the light to the supplemental waveguide. However, the full elimination of the light only by setting the phase difference requires a fine adjustment of the phase difference, and often leaks the light in the Y-QPSK modulator in the optical output of the X-QPSK modulator.

The arrangement of the present embodiment eliminates the component from the other QPSK modulator only by increasing the optical absorption, not the phase difference between the light, and substantially gives no effect to the phase shift of the light. Moreover, the increase of the optical absorption in the waveguide may be only by supplying the bias exceeding the critical value Vdis, not to match with a specific level, which drastically simplify and facilitate the initialization of the optical transmitter.

The optical modulator, and the method to control the optical output power, is not restricted to those of the embodiment described above. For instance, the invention is applicable to the DP-mPSK modulator; m is an integer greater than 1, (Dual Polarization m-ray Phase Shift Keying). The embodiment described above has an arrangement that the substrate thereof is made of material showing the QCSE. However, the invention may have an arrangement where only the waveguides, $wg_{23}$, $wg_{24}$, $wg_{33}$, and $wg_{34}$, shows the QCSE. Although the embodiment shown in FIG. 1 implements with the beam splitter 3 in downstream of the light source 2. However, when the light source 2 generates light with substantially liner polarization, such as a semiconductor LD, the beam splitter 3 may be eliminated.

Furthermore, the embodiment described above concentrates on the optical transmitter including two QPSK modulators where the bias, $V_1$ or $V_2$, to vanish the optical power output from respective QPSK modulators is provided evenly to the electrodes set in the downstream of respective MZ-interferometer. However, the mechanism according to the invention may be used only for the single DPSK modulator to vanish the light attributed one of the MZ-interferometer. That is, the substantial bias is applied only to one of the electrodes set in the downstream of the MZ-interferometer and no bias is provided to the other electrode. Then, the optical power output from the QPSK modulator is fully attributed only to the MZ-interferometer receiving no bias. Switching the condition to provide the bias, the optical performance of the other MZ-interferometer may be evaluated.

Thus, it will be evident that various modifications and changes may be made thereto without departing from the broader spirit and scope of the present invention. The present specification and figures are accordingly to be regarded as illustrative rather than restrictive.

What is claimed is:

1. An optical transmitter, comprising:
a first quadrature phase shift keying (QPSK) modulator including a first Mach-Zehnder (MZ) interferometer and a first waveguide, the first QPSK modulator outputting a first optical signal, the first waveguide showing a Quantum Confined Stark Effect (QCSE), being coupled with an output port of the first MZ interferometer, and having a first electrode configured to receive a first bias, an optical power of the first optical signal decreasing as the first bias increases; and
a second QPSK modulator including a second MZ interferometer and a second waveguide the second QPSK modulator outputting a second optical signal, the second waveguide showing the QCSE, being coupled with an output port of the second MZ interferometer, and having a second electrode configured to receive a second bias, an output power of the second optical signal decreasing as the second bias increases,
wherein the optical transmitter outputs only the first optical signal when the first bias is set to substantially zero volts and the second bias is set to a voltage higher than a first critical voltage, and outputs only the second optical signal when the first bias is set to another voltage higher than a second critical voltage and the second bias is set to substantially zero volts.

2. The optical transmitter of claim 1,
wherein the first waveguide and the second waveguide are made of semiconductor material.

3. The optical transmitter of claim 1,
further providing a light source to generate an optical signal having a substantially linear polarization.

4. The optical transmitter of claim 1,
further providing a light source and a beam splitter set between the light source and the first and second QPSK modulators,
where the beam splitter splits an optical signal output from the light source into two beams each maintaining a polarization of the optical signal.

5. The optical transmitter of claim 1,
wherein the first QPSK modulator and the second QPSK modulator each provide a power monitor and a supplemental path divided from the first waveguide and the second waveguide, respectively, and
wherein each of the power monitors optically couples with the supplemental path to detect optical power of light propagating in the supplemental path.

6. The optical transmitter of claim 5, further comprising:
a light source to generate an optical signal, and
a power controller that controls optical power of the optical signal based on an output of the power monitor of the first QPSK modulator and an output of the power monitor of the second QPSK modulator.

7. The optical transmitter of claim 1, further comprising a power controller,
wherein the first QPSK modulator provides a pair of first MZ interferometers each having the first electrode, and the second QPSK modulator provides a pair of second MZ interferometers each having the second electrode, and wherein the power controller concurrently causes light propagating in the first MZ interferometers in the first QPSK modulator to vanish by providing the first bias to the first electrodes, and
wherein the power controller concurrently causes light propagating in the second MZ interferometers in the second QPSK modulator to vanish by providing the second bias to the second electrodes.

8. The optical transmitter of claim 1, further comprising:
a power controller configured to keep a first proportional constant $\alpha$ and a second proportional constant $\beta$ and to provide the first bias to the first electrode and the second bias to the second electrode, respectively, wherein
the first QPSK modulator further includes a first power monitor configured to output a first photo current Ix corresponding to an optical power of the first optical signal,
the second QPSK modulator further includes a second power monitor configured to output a second photo current Iy corresponding to an optical power of the second optical signal, and
the power controller receives the first photo current ix and the second photo current Iy, and equalizes $\alpha \times Ix$ with $\beta \times Iy$ by adjusting the first bias and the second bias.

9. The optical transmitter of claim 8, further comprising:
a light source configured to provide a CW beam to be split and provided to the first QPSK modulator and the second QPSK modulator, an putput power of the CW beam being changed by a control signal,
wherein the power controller calculates an output power of Pout of an output signal output from the optical transmitter by using a formula, $Pout = \alpha \times Ix + \beta \times Iy$,
and provides the control signal to cause a calculated value of the output power Pout to become substantially equal to a predetermined target value.

10. A method to control optical power output from an optical transmitter that includes a light source and first and second quadrature phase shift keying (QPSK) modulators each providing first and second Mach-Zehnder (MZ) interferometers, first and second waveguides, and first and second power monitors configured to monitor output powers of the first and second QPSK modulators, the first and second waveguides showing a Quantum Confined Stark Effect (QCSE), being coupled with output ports of the first and second MZ interferometers, and having first and second electrodes configured to receive a first and a second bias, said method comprising steps of:
initializing the optical transmitter by,
setting the first bias to substantially zero volts, setting the second bias to a voltage higher than a critical voltage, determining a first proportional constant $\alpha$ by using a measured output power Pout of the optical transmitter and an output current Ix of the first power monitor in the first QPSK modulator, and storing the first proportional constant $\alpha$, and
setting the second bias to substantially zero volts, setting the first bias to another voltage higher than another critical voltage, determining a second proportional constant $\beta$ by using a measured output power Pout of the optical transmitter and an output current Iy of the second power monitor in the second QPSK modulator, and storing the second proportional constant $\beta$; and
practically operating the optical transmitter by,
receiving the output current Ix and the output current Iy from the first power monitor and second power monitor, and adjusting the first bias and the second bias so as to equalize $\alpha \times Ix + \beta \times Iy$, and calculating an output power Pout of an output signal output from the optical transmitter by using a formula:

Pout=α×Ix+β×Iy, and adjusting optical power output from the light source so that a calculated value of the output power Pout becomes substantially equal to a predetermined target value.

11. The method of claim 10, further comprising generating an optical signal having a substantially linear polarization by the light source.

12. The method of claim 10, further comprising using a beam splitter set between the light source and the first and second QPSK modulators to split an optical signal output from the light source into two beams that each maintain a polarization of the optical signal.

13. The optical transmitter of claim 10,
wherein, in the optical transmitter, the first QPSK modulator and the second QPSK modulator each provide a supplemental path divided from the first waveguide and the second waveguide, respectively, and
wherein each of the power monitors optically couples with the supplemental path to detect optical power of light propagating in the supplemental path.

14. The method of claim 13, wherein the optical transmitter includes a power controller, and the method further comprises using the power controller to initialize the optical transmitter and practically operate the optical transmitter.

* * * * *